(12) United States Patent
Ball et al.

(10) Patent No.: US 9,188,453 B2
(45) Date of Patent: Nov. 17, 2015

(54) CONSTRAINED SERVICE RESTORATION WITH HEURISTICS

(71) Applicant: SAS Institute Inc., Cary, NC (US)

(72) Inventors: Kathy Ball, Cary, NC (US); Albert Hopping, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 45 days.

(21) Appl. No.: 14/041,423

(22) Filed: Sep. 30, 2013

(65) Prior Publication Data

US 2014/0257694 A1      Sep. 11, 2014

Related U.S. Application Data

(60) Provisional application No. 61/774,029, filed on Mar. 7, 2013, provisional application No. 61/775,817, filed on Mar. 11, 2013, provisional application No. 61/825,522, filed on May 21, 2013.

(51) Int. Cl.
*G01C 21/34*    (2006.01)
*G06Q 10/04*    (2012.01)
(Continued)

(52) U.S. Cl.
CPC .............. *G01C 21/343* (2013.01); *G06Q 10/04* (2013.01); *G06Q 10/0631* (2013.01); *G06Q 50/06* (2013.01)

(58) Field of Classification Search
CPC .. G01C 21/34; G01C 21/3407; G01C 21/343; G06Q 10/00; G06Q 10/047; G06Q 10/06; G06Q 10/0631; G06Q 10/06311; G06Q 10/063112; G06Q 10/06315; G06Q 50/06
USPC .......................................... 701/527; 455/521
See application file for complete search history.

(56) References Cited

U.S. PATENT DOCUMENTS 3,747,104 A     7/1973    Pansini
5,684,710 A    11/1997    Ehlers et al.
(Continued)

FOREIGN PATENT DOCUMENTS

CA             2761111          5/2005
WO      WO 2009/158017        12/2009
WO      WO 2010/051287         5/2010

OTHER PUBLICATIONS van Eiji, C.A., A polyhedral approach to the delivery man problem, 1995, Eindhoven University of Technology, Memorandum COSOR 95-19, pp. 1-15.*

(Continued)

*Primary Examiner* — Fadey Jabr
*Assistant Examiner* — Aaron L Troost
(74) *Attorney, Agent, or Firm* — Bell & Manning, LLC (57) ABSTRACT

A method of determining service routes for a plurality of crews is provided. Outage data identifying a plurality of service outage source locations, a number of affected customers associated with each location of the plurality of locations, and a type of repair to perform at each location of the plurality of locations is received. A repair time is estimated for each location. Crew data identifying a plurality of crews and a start location for the plurality of crews is received. A service route for each crew is determined based on a crew skill indicator associated with each crew satisfying the type of repair to perform at each location and based on the estimated repair time for each location. The service route for a crew of the plurality of crews includes the start location as a first location and at least one location of the plurality of locations.

27 Claims, 6 Drawing Sheets

(51) Int. Cl.
*G06Q 10/06* (2012.01)
*G06Q 50/06* (2012.01)

(56) References Cited

U.S. PATENT DOCUMENTS

| | | | |
|---|---|---|---|
| 5,920,846 A | 7/1999 | Storch et al. | |
| 6,798,211 B1 | 9/2004 | Rockwell et al. | |
| 6,952,648 B1 | 10/2005 | Menard et al. | |
| 7,010,437 B2* | 3/2006 | Lubkeman et al. | 702/58 |
| 7,162,199 B1 | 1/2007 | Glickstein et al. | |
| 7,283,916 B2 | 10/2007 | Cahill-O'Brien et al. | |
| 7,308,370 B2 | 12/2007 | Mason, Jr. et al. | |
| 7,421,334 B2 | 9/2008 | Dahlgren et al. | |
| 7,436,937 B2 | 10/2008 | Clawson | |
| 7,725,339 B1 | 5/2010 | Aykin | |
| 7,739,138 B2 | 6/2010 | Chauhan et al. | |
| 8,275,404 B2 | 9/2012 | Berger et al. | |
| 8,314,683 B2 | 11/2012 | Pfeffer | |
| 8,315,237 B2 | 11/2012 | Berger et al. | |
| 8,368,562 B2 | 2/2013 | Horstemeyer | |
| 8,417,533 B2 | 4/2013 | Clawson | |
| 8,606,611 B1 | 12/2013 | Fedorov et al. | |
| 8,738,412 B2 | 5/2014 | Flockhart et al. | |
| 2002/0087220 A1 | 7/2002 | Tveit et al. | |
| 2005/0091368 A1 | 4/2005 | Ozburn | |
| 2005/0096962 A1* | 5/2005 | Narasimhan et al. | 705/9 |
| 2007/0030144 A1 | 2/2007 | Titus et al. | |
| 2008/0021747 A1 | 1/2008 | Moeller et al. | |
| 2008/0091507 A1 | 4/2008 | Bankston et al. | |
| 2008/0177678 A1 | 7/2008 | Di Martini et al. | |
| 2008/0195257 A1 | 8/2008 | Rauch | |
| 2008/0288321 A1* | 11/2008 | Dillon et al. | 705/9 |
| 2009/0070024 A1 | 3/2009 | Burchard et al. | |
| 2009/0284348 A1* | 11/2009 | Pfeffer | 340/7.3 |
| 2012/0004869 A1 | 1/2012 | Saarinen et al. | |
| 2012/0185163 A1 | 7/2012 | Boschker et al. | |
| 2012/0259540 A1 | 10/2012 | Kishore et al. | |
| 2014/0046585 A1* | 2/2014 | Morris et al. | 701/468 |
| 2014/0257895 A1 | 9/2014 | Ball et al. | |
| 2014/0257913 A1 | 9/2014 | Ball et al. | |

OTHER PUBLICATIONS

Weintraub et al., An Emergency Vehicle Dispatching System for an Electric Utility in Chile, Journal of the Operational Research Society, vol. 50, No. 7 , Jul. 1999, pp. 690-696.
Spectra OMS Outage Management System, 2011, Open Systems International, Inc.
StormWorks, Downloaded from http://www.geodigital.com/document_library/Insert-GDI-Fact-Sheet_StormWorks.pdf on Nov. 12, 2013.
Smith-Jackson et al., Accessible emergency management a human factors engineering approach, Chapter 11 of Handbook of Emergency Response: A Human Factors and Systems Engineering Approach, edited by Badiru et al., 2010, pp. 251-272.
Badiru et al., Coordinated project systems approach to emergency response, Chapter 17 of Handbook of Emergency Response: A Human Factors and Systems Engineering Approach, edited by Badiru et al., 2010, pp. 413-438.
Coles et al., Decisions in disaster recovery operations a game theorectic perspective on organization cooperation, Chapter 19 of Handbook of Emergency Response: A Human Factors and Systems Engineering Approach, edited by Badiru et al., 2010, pp. 465-480.
S. Devaux, Time is a murderer the cost of critical path drag in emergency response, Chapter 21 of Handbook of Emergency Response: A Human Factors and Systems Engineering Approach, edited by Badiru et al., 2010, pp. 501-530.
Archer et al., Faster Approximation Algorithms for the Minimum Latency Problem, 2003, pp. 1-16.
Archer et al., A Faster, Better Approximation Algorithm for the Minimum Latency Problem, 2003, pp. 1-15.
Archer et al., A Faster, Better Approximation Algorithm for the Minimum Latency Problem, Siam J. Comput., vol. 37, No. 5, 2008, pp. 1472-1498.
Arora et al., Approximation Schemes for Minimum Latency Problems, 2003.
Ausiello et al., On Salesmen, Repairmen, Spiders and other Traveling Agents, 2000.
Bertsimas et al., A Stochastic and Dynamic Vehicle Routing Problem in the Euclidean Plane, Operations Research, vol. 39, No. 4, Jul.-Aug. 1991, pp. 601-615.
Blum et al., The Minimum Latency Problem, Association of Computer Machinery, Montreal, Quebec, Canada, 1994, pp. 163-171.
Chaudhuri et al., Paths, Trees, and Minimum Latency Tours, 2003, pp. 1-10.
Dewilde et al., Heuristics for the Traveling Repairman Problem with Profits, 10th Workshop on Algorithmic Approaches for Transportation Modelling, Optimization, and Systems (ATMOS'10), Editors: Thomas Erlebach, Marco Lübbecke, 2010, pp. 34-44.
Ezzine et al., New Formulations for the Traveling Repairman Problem, 8th International Conference of Modeling and Simulation—MOSIM'10, Hammamet, Tunisia, May 10-12, 2010.
Fakcharoenphol et al., The k-Traveling Repairman Problem, 2003, pp. 655-664.
Fakcharoenphol et al., The k-Traveling Repairmen Problem, ACM Transactions on Algorithms, vol. 3, No. 4, Article 40, Nov. 2007, pp. 1-16.
Fischetti et al., The Delivery Man Problem and Cumulative Matroids, Operations Research, vol. 41, No. 6, Nov.-Dec. 1993, pp. 1055-1064.
Goemans et al., An improved approximation ratio for the minimum latency problem, Mathematical Programming, vol. 82, 1998, pp. 111-124.
Jothi et al., Approximating the k-traveling repairman problem with repairtimes, Journal of Discrete Algorithms, vol. 5, Jul. 24, 2006, pp. 293-303.
Krumke et al., News from the online traveling repairman, Theoretical Computer Science, vol. 295, 2003, pp. 279-294.
Méndez-Díaz et al., A new formulation for the Traveling Deliveryman Problem, Discrete Applied Mathematics, vol. 156, Jun. 27, 2008, pp. 3223-3237.
Pillac et al., A Review of Dynamic Vehicle Routing Problems, European Journal of Operational Research, vol. 225, No. 1, Feb. 16, 2013, pp. 1-11.
Salehipour et al., An efficient GRASP+VND metaheuristic for the traveling repairman problem, University of Antwerp, Belgium, 2008, pp. 1-15.
Tsitsiklis et al., Special Cases of Traveling Salesman and Repairman Problems with Time Windows, Networks, vol. 22, 1992, pp. 263-282.
Wu et al., Exact algorithms for the minimum latency problem, 2004, pp. 1-11.

* cited by examiner

CONSTRAINED SERVICE RESTORATION WITH HEURISTICS

CROSS-REFERENCE TO RELATED APPLICATIONS

The present application claims priority under 35 U.S.C. §119(e) to U.S. Provisional Patent Application No. 61/774,029 filed Mar. 7, 2013, to U.S. Provisional Patent Application No. 61/775,817 filed Mar. 11, 2013, and to U.S. Provisional Patent Application No. 61/825,522 filed May 21, 2013, the entire contents of which are all hereby incorporated by reference.

BACKGROUND

After a storm has passed and emergency repairs are complete, a utility may be faced with the daunting task of restoring service, such as power, water, gas, etc., to multiple customers. For example, three days after Hurricane Irene struck the east coast and after the initial emergency restorations, the state of Massachusetts was faced with over 65,000 power outages and over 10,000 transformer failures.

SUMMARY

In an example embodiment, a method of determining service routes for a plurality of crews is provided. Outage data identifying a plurality of service outage source locations, a number of affected customers associated with each location of the plurality of locations, and a type of repair to perform at each location of the plurality of locations is received. A repair time is estimated for each location of the plurality of locations. Crew data identifying a plurality of crews and a start location for the plurality of crews is received. A service route for each crew of the plurality of crews is determined based on a crew skill indicator associated with each crew satisfying the type of repair to perform at each location of the plurality of locations and based on the estimated repair time for each location. The service route for a crew of the plurality of crews includes the start location as a first location and at least one location of the plurality of locations In another example embodiment, a computer-readable medium is provided having stored thereon computer-readable instructions that when executed by a computing device, cause the computing device to perform the method of determining service routes for a plurality of crews.

In yet another example embodiment, a system is provided. The system includes, but is not limited to, a processor and a computer-readable medium operably coupled to the processor. The computer-readable medium has instructions stored thereon that, when executed by the processor, cause the system to perform the method of determining service routes for a plurality of crews.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
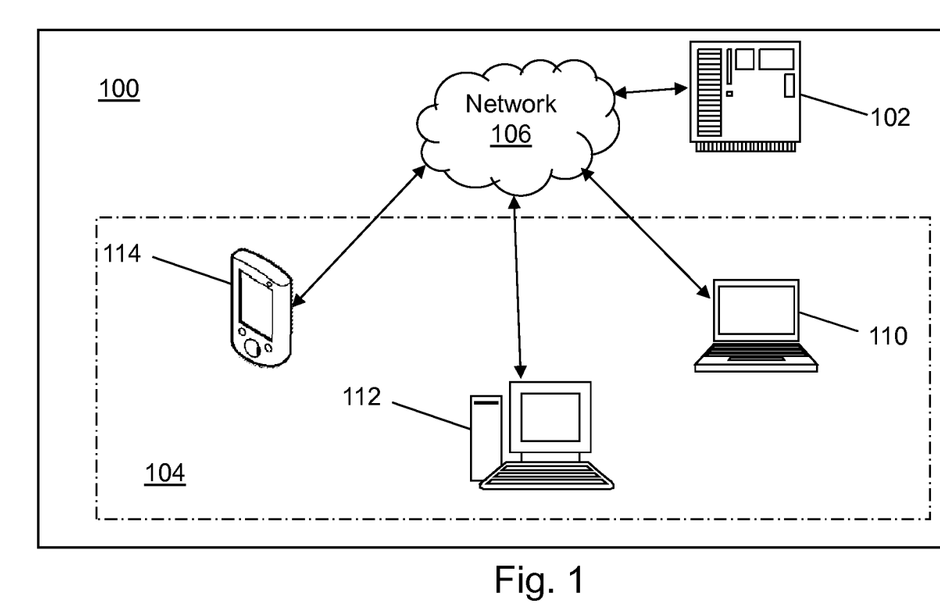
FIG. 1 depicts a block diagram of a routing determination system in accordance with an illustrative embodiment.

Referring to FIG. 1, a block diagram of a routing determination system 100 is shown in accordance with an illustrative embodiment. In an illustrative embodiment, routing determination system 100 may include a routing assignment system 102, a crew communication system 104, and a network 106. The components of routing determination system 100 may be distributed geographically from one another. Routing assignment system 102 assigns routes to crews and communicates updates with the crews using crew communication system 104 and network 106.

Network 106 supports communication between the components of routing determination system 100. Network 106 may include one or more networks of the same or different types. Network 106 can be any type of wired and/or wireless public or private network including a cellular network, a local area network, a wide area network such as the Internet, etc. Network 106 further may comprise sub-networks and consist of any number of devices.

Crew communication system 104 can include any number and type of computing devices that may be organized into subnets. The computing devices of crew communication system 104 may send signals through network 106 to another of the one or more computing devices of crew communication system 104 and/or to routing assignment system 102. The computing devices of crew communication system 104 may receive signals through network 106 from another of the one or more computing devices of crew communication system 104 and/or from routing assignment system 102. The one or more computing devices of crew communication system 104 may include computers of any form factor such as a laptop 110, a desktop 112, a smart phone 114, a personal digital assistant, an integrated messaging device, a tablet computer, etc. The one or more computing devices of crew communication system 104 may communicate using various transmission media that may be wired and/or wireless as understood by those skilled in the art.

In the illustrative embodiment, routing assignment system 102 is represented as a server computing device though routing assignment system 102 may include one or more computing devices of any form factor that may be organized into subnets. Routing assignment system 102 may send signals through network 106 to crew communication system 104. Routing assignment system 102 may receive signals through network 106 from crew communication system 104. Routing assignment system 102 may communicate using various transmission media that may be wired and/or wireless as understood by those skilled in the art.

Figure 2:
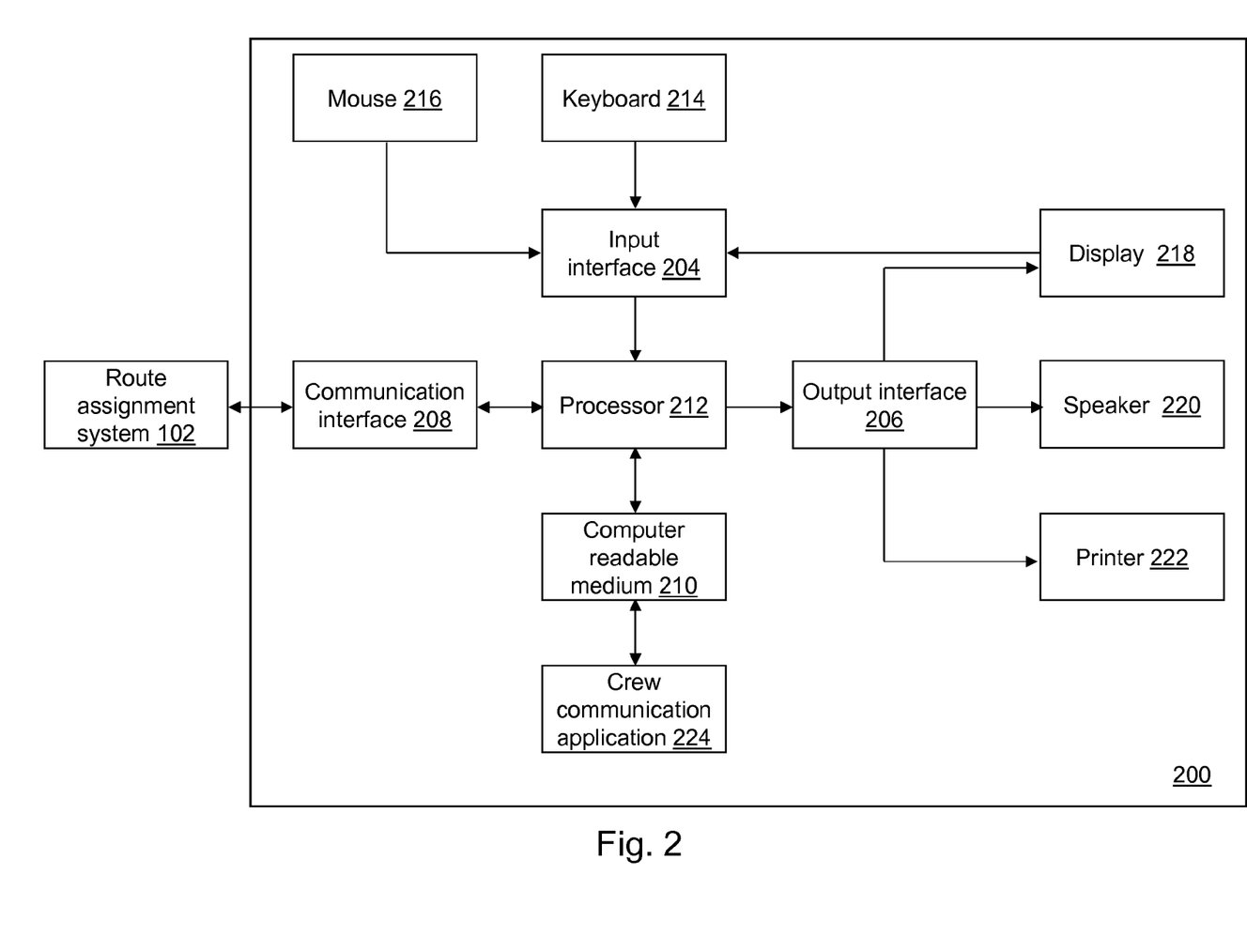
FIG. 2 depicts a block diagram of a crew communication device of the routing determination system of FIG. 1 in accordance with an illustrative embodiment.

Referring to FIG. 2, a block diagram of a crew communication device 200 of crew communication system 104 is shown in accordance with an illustrative embodiment. Crew communication device 200 is an example computing device of crew communication system 104. Crew communication device 200 may include an input interface 204, an output interface 206, a communication interface 208, a computer-readable medium 210, a processor 212, a keyboard 214, a mouse 216, a display 218, a speaker 220, a printer 222, and a crew communication application 224. Fewer, different, and/or additional components may be incorporated into crew communication device 200.

Input interface 204 provides an interface for receiving information from the user for entry into crew communication device 200 as understood by those skilled in the art. Input interface 204 may interface with various input technologies including, but not limited to, keyboard 214, mouse 216, display 218, a track ball, a keypad, one or more buttons, etc. to allow the user to enter information into crew communication device 200 or to make selections in a user interface displayed on display 218. Display 218 may be a thin film transistor display, a light emitting diode display, a liquid crystal display, or any of a variety of different display types as understood by those skilled in the art. The same interface may support both input interface 204 and output interface 206. For example, a display comprising a touch screen both allows user input and presents output to the user. Crew communication device 200 may have one or more input interfaces that use the same or different input interface technologies. Keyboard 214, mouse 216, display 218, etc. further may be accessible by crew communication device 200 through communication interface 208.

Output interface 206 provides an interface for outputting information for review by a user of crew communication device 200. For example, output interface 206 may interface with various output technologies including, but not limited to, display 218, speaker 220, printer 222, etc. Crew communication device 200 may have one or more output interfaces that use the same or different interface technologies. Speaker 220, printer 222, etc. further may be accessible by crew communication device 200 through communication interface 208.

Communication interface 208 provides an interface for receiving and transmitting data between devices using various protocols, transmission technologies, and media as understood by those skilled in the art. Communication interface 208 may support communication using various transmission media that may be wired and/or wireless. Crew communication device 200 may have one or more communication interfaces that use the same or different communication interface technologies. Data and messages may be transferred between crew communication device 200 and routing assignment system 102 using communication interface 208.

Computer-readable medium 210 is an electronic holding place or storage for information so the information can be accessed by processor 212 as understood by those skilled in the art. Computer-readable medium 210 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, cache memory, etc. Crew communication device 200 may have one or more computer-readable media that use the same or different memory media technologies. Crew communication device 200 also may have one or more drives that support the loading of a memory media such as a CD or DVD.

Processor 212 executes instructions as understood by those skilled in the art. The instructions may be carried out by a special purpose computer, logic circuits, or hardware circuits. Processor 212 may be implemented in hardware and/or firmware. The term "execution" defines the process of running an application or performing the operation called for by an instruction. The instructions may be written using one or more programming language, scripting language, assembly language, etc. that may be compiled. Processor 212 executes an instruction, meaning it performs/controls the operations called for by that instruction. Processor 212 operably couples with input interface 204, with output interface 206, with communication interface 208, and with computer-readable medium 210 to receive, to send, and to process information. Processor 212 may retrieve a set of instructions from a permanent memory device and copy the instructions in an executable form to a temporary memory device that is generally some form of RAM. Crew communication device 200 may include a plurality of processors that use the same or different processing technologies.

Crew communication application 224 performs operations associated with supporting communication of route assignment information with routing assignment system 102. For example, a crew may send a communication to routing assignment system 102 indicating completion of a repair, indicating a delay in completion of a service repair and an estimated completion time, etc. The crew further may receive a communication from routing assignment system 102 indicating a route assignment and/or an updated route assignment. A route assignment may indicate one or more geographic locations at which a repair is to be performed by the crew. A crew may include one or more individuals with the same or different skills related to performing the repair. For illustration, a repair is a response to correct a service outage such as a power outage and the type of service may include tree cutting, overhead line repair, underground line repair, overhead transformer repair, underground transformer repair, overhead transformer replacement, and underground transformer replacement, etc. Other service outages may include a gas outage, a water outage, etc.

Some or all of the operations described herein may be embodied in crew communication application 224. The operations may be implemented using hardware, firmware, software, or any combination of these. Referring to the example embodiment of FIG. 2, crew communication application 224 is implemented in software (comprised of computer-readable and/or computer-executable instructions) stored in computer-readable medium 210 and accessible by processor 212 for execution of the instructions that embody the operations of crew communication application 224. Crew communication application 224 may be written using one or more programming languages, assembly languages, scripting languages, etc.

Crew communication application 224 may be implemented as a Web application. For example, crew communication application 224 may be configured to receive hypertext transport protocol (HTTP) responses from other computing devices, such as those associated with routing assignment system 102, and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Figure 3:
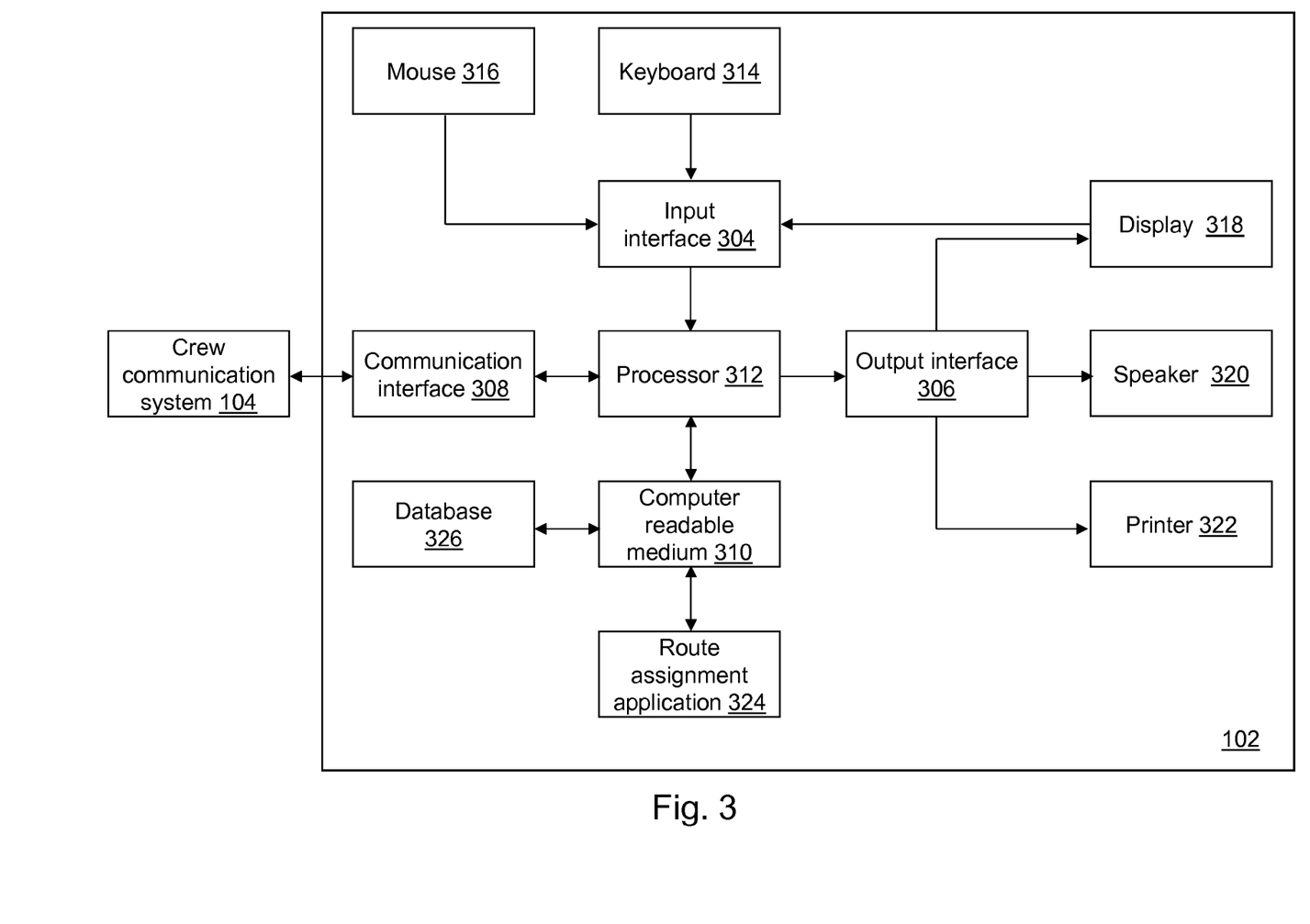
FIG. 3 depicts a block diagram of a routing assignment system of the routing determination system of FIG. 1 in accordance with an illustrative embodiment.

Referring to FIG. 3, a block diagram of routing assignment system 102 is shown in accordance with an illustrative embodiment. Routing assignment system 102 may include a second input interface 304, a second output interface 306, a second communication interface 308, a second computer-readable medium 310, a second processor 312, a second keyboard 314, a second mouse 316, a second display 318, a second speaker 320, a second printer 322, a route assignment application 324, and a database 326. Fewer, different, and/or additional components may be incorporated into routing assignment system 102.

Second input interface 304 provides the same or similar functionality as that described with reference to input interface 204 of crew communication device 200 though referring to routing assignment system 102 instead of crew communication device 200. Second output interface 306 provides the same or similar functionality as that described with reference to output interface 206 of crew communication device 200 though referring to routing assignment system 102 instead of crew communication device 200. Second communication interface 308 provides the same or similar functionality as that described with reference to communication interface 208 of crew communication device 200 though referring to routing assignment system 102 instead of crew communication device 200. Data and messages may be transferred between routing assignment system 102 and crew communication system 104 using second communication interface 308. Second computer-readable medium 310 provides the same or similar functionality as that described with reference to computer-readable medium 210 of crew communication device 200 though referring to routing assignment system 102 instead of crew communication device 200. Second processor 312 provides the same or similar functionality as that described with reference to processor 212 of crew communication device 200 though referring to routing assignment system 102 instead of crew communication device 200. Second keyboard 314 provides the same or similar functionality as that described with reference to keyboard 214 of crew communication device 200 though referring to routing assignment system 102 instead of crew communication device 200. Second mouse 316 provides the same or similar functionality as that described with reference to mouse 216 of crew communication device 200 though referring to routing assignment system 102 instead of crew communication device 200. Second display 318 provides the same or similar functionality as that described with reference to display 218 of crew communication device 200 though referring to routing assignment system 102 instead of crew communication device 200. Second speaker 320 provides the same or similar functionality as that described with reference to speaker 220 of crew communication device 200 though referring to routing assignment system 102 instead of crew communication device 200. Second printer 322 provides the same or similar functionality as that described with reference to printer 222 of crew communication device 200 though referring to routing assignment system 102 instead of crew communication device 200.

Route assignment application 324 performs operations associated with determining a route assignment for a crew. Some or all of the operations described herein may be embodied in route assignment application 324. The operations may be implemented using hardware, firmware, software, or any combination of these. Referring to the example embodiment of FIG. 3, route assignment application 324 is implemented in software (comprised of computer-readable and/or computer-executable instructions) stored in second computer-readable medium 310 and accessible by second processor 312 for execution of the instructions that embody the operations of route assignment application 324. Route assignment application 324 may be written using one or more programming languages, assembly languages, scripting languages, etc.

Route assignment application 324 may be implemented as a Web application. For example, route assignment application 324 may be configured to receive HTTP responses from other computing devices, such as those associated with crew communication system 104, and to send HTTP requests. The HTTP responses may include web pages such as HTML documents and linked objects generated in response to the HTTP requests. Each web page may be identified by a URL that includes the location or address of the computing device that contains the resource to be accessed in addition to the location of the resource on that computing device. The type of file or resource depends on the Internet application protocol. The file accessed may be a simple text file, an image file, an audio file, a video file, an executable, a common gateway interface application, a Java applet, an XML file, or any other type of file supported by HTTP.

Routing assignment system 102 may include database 326 stored on second computer-readable medium 310 or can access second database 326 either through a direct connection or through network 106 using second communication interface 308. Database 326 is a data repository for routing determination system 100. For example, the data processed using route assignment application 324 may be stored in database 326. Database 326 may include a plurality of databases that may be organized into multiple database tiers to improve data management and access. Database 326 may be stored in one or more storage locations distributed over network 106 and using the same or different formats. Database 326 may utilize various database technologies and a variety of formats as known to those skilled in the art including a file system, a relational database, a system of tables, a structured query language database, etc.

Route assignment application 324 and crew communication application 224 may be the same or separate applications or part of an integrated, distributed application supporting some or all of the same or additional types of functionality as described herein. As an example, the functionality provided by route assignment application 324 and crew communication application 224 may be provided as part of processing associated with SAS®OR, SAS®VA, SAS®EM, SAS®EG, etc. offered by SAS Institute Inc., the assignee of the current application. Various levels of integration between the components of routing determination system 100 may be implemented without limitation as understood by a person of skill in the art.

Figure 4:
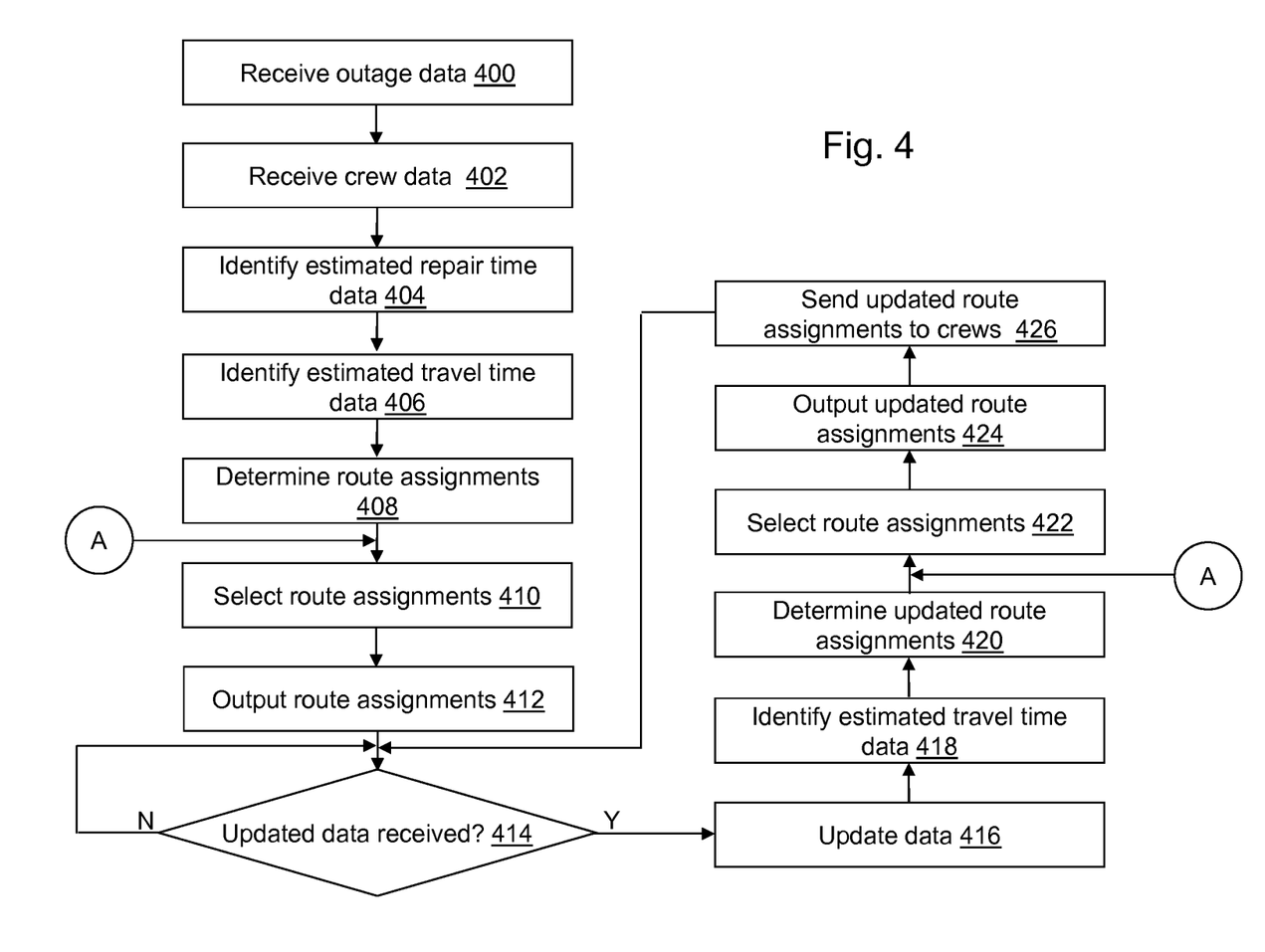
FIG. 4 depicts a first flow diagram illustrating examples of operations performed by the routing assignment system of FIG. 3 in accordance with an illustrative embodiment.

Referring to FIG. 4, example operations associated with route assignment application 324 are described. Additional, fewer, and/or different operations may be performed depending on the embodiment. The order of presentation of the operations of FIG. 4 is not intended to be limiting. A user can interact with one or more user interface windows presented to the user in second display 318 under control of route assignment application 324 independently or through a browser application in an order selectable by the user. Although some of the operational flows are presented in sequence, the various operations may be performed in various repetitions, concurrently (in parallel), and/or in other orders than those that are illustrated.

For example, a user may execute route assignment application 324, which causes presentation of a first user interface window, which may include a plurality of menus and selectors such as drop down menus, buttons, text boxes, hyperlinks, etc. associated with route assignment application 324 as understood by a person of skill in the art. Route assignment application 324 controls the presentation of one or more additional user interface windows that further may include menus and selectors such as drop down menus, buttons, text boxes, hyperlinks, additional windows, etc. based on user selections received by route assignment application 324.

As understood by a person of skill in the art, the user interface windows are presented on second display 318 under control of the computer-readable and/or computer-executable instructions of route assignment application 324 executed by second processor 312 of routing assignment system 102. As the user interacts with the user interface windows presented under control of route assignment application 324, different user interface windows may be presented to provide the user with various controls from which the user may make selections or enter values associated with various application controls. In response, as understood by a person of skill in the art, route assignment application 324 receives an indicator associated with an interaction by the user with a user interface window. Based on the received indicator, route assignment application 324 performs one or more additional operations.

In an operation 400, outage data is received. As an example, the outage data may be selected by a user using a user interface window and received by route assignment application 324. For example, the outage data may be stored in second computer-readable medium 310 as a file and/or in database 326 and received by retrieving the outage data from the appropriate memory location as understood by a person of skill in the art. For example, the outage data may be received from one or more files, through one or more user interface windows, etc.

In an illustrative embodiment, the outage data is organized as a plurality of fields for a plurality of records. Merely for illustration, the outage data may include service outage source location information such as a town identifier, a latitude, a longitude, and an altitude, a number of affected customers associated with each service outage source location, and a type of repair to perform at each service outage source location. An example dataset may include from a few to hundreds of fields or more and from a few to tens of thousands of records or more without limitation. Of course, an altitude may be assumed to be constant between the service outage source locations.

In an operation 402, crew data is received. As an example, the crew data may be selected by a user using a user interface window and received by route assignment application 324. For example, the crew data may be stored in second computer-readable medium 310 as a file and/or in database 326 and received by retrieving the crew data from the appropriate memory location as understood by a person of skill in the art. The crew data may be received from different computer-readable media. For example, the crew data may be received from one or more files, through one or more user interface windows, etc.

In an illustrative embodiment, the crew data is organized as a plurality of fields for a plurality of records. Merely for illustration, the data may include a crew name, a crew equipment type indicator, a crew skill indicator, a crew maximum shift time, crew shift time data, a number of crew members in the crew, an average number of years of experience of the crew members, a maximum vehicle speed for the equipment associated with the crew, etc. The crew equipment type indicator may indicate a type of equipment such as a type of truck and/or equipment on the truck. The crew skill indicator may indicate crew skills such as whether or not the crew has underground line repair, aboveground line repair, overhead transformer repair/replacement, underground transformer repair/replacement, and/or tree cutting skills. In an illustrative embodiment, crew equipment type indicator and crew skill indicator are combined into a single indicator that indicates whether or not the crew has both the personnel skills and the equipment to perform different types of repair services. For example, a unique number may be associated with the combination of the personnel skills and the equipment to perform different types of repair services. The crew maximum shift time indicates the amount of time that the crew can work, for example, in a 24-hour period. Crew shift time data may further include any other shift timing requirements such as an earliest start time, a latest stop time, a number of breaks and the duration of each break, a time-off between work schedules, etc. An example dataset may include from a few to hundreds of fields or more and from a few to tens of thousands of records or more without limitation. The outage data and the crew data may be stored in and retrieved from the same or different memory storage locations.

In an operation 404, an estimated repair time, $T_R$, is identified. For example, a numerical value is received that indicates a user selection of the value to be used for $T_R$. $T_R$ may be defined as a function of a type of repair to be performed at each location, as a function of a crew experience level, as a function of a crew size, as a function of a crew equipment type, etc. A single value for $T_R$ may be identified, a value may be identified for each service outage source location, for each crew, etc. As an example, $T_R$ may be determined for each service outage source location and stored with the outage data.

The value of $T_R$ may be entered by the user using second mouse 316, second keyboard 314, second display 318, etc. In an illustrative embodiment, instead of receiving a user selection through a presented user interface window, a default value for $T_R$ may be stored in second computer-readable medium 310 and received by retrieving the value from the appropriate memory location as understood by a person of skill in the art. For example, database 326 may include one or more values for $T_R$.

In an illustrative embodiment, an estimated repair time, $T_R$, is determined statistically using a probability function. The probability function and parameters associated with defining the probability distribution for $T_R$ may be entered and/or selected by the user using, for example, a user interface window. The probability function and/or parameters may vary based on a characteristic of the repair, of the crew, of the outage location, etc. For example, the probability function may be defined/selected based on the type of repair to perform at each service outage source location. As another example, the probability function and/or parameters may be defined/selected based on analysis of a dataset of actual repair times based on the type of repair, for example, using a curve fitting algorithm. Of course, a constant value is a type of probability distribution.

In an operation 406, an estimated travel time, $T_T$, is identified. For example, a numerical value is received that indicates a value to be used for $T_T$ between each pair of service outage source locations. The value(s) of $T_T$ may be identified by selecting a file where values are stored in association with each pair of service outage source locations. Of course, $T_T$ may be defined as a constant value or using a probability function as discussed with reference to $T_R$. A value of $T_T$ may be calculated between each pair of service outage source locations based on a distance D calculated between the two locations and a travel speed v using $T_T = D/v$.

For example, D may be calculated based on a straight-line distance using the latitude, longitude, and altitude coordinates of each pair of service outage source locations as understood by a person of skill in the art. As another example, a geographic information system may determine D as a shortest route determined by traveling on existing roads as understood by a person of skill in the art. As yet another example, a straight line calculation may be used that includes a factor based on the curvature of the earth. The roads used in determining the shortest route may be restricted based on travel requirements for the crew equipment, based on current road and weather conditions, etc. For example, if a bridge is washed out or unable to support the weight of the crew equipment, the road is not selected as part of the shortest route determination.

v may be defined as a function of the type of road(s) to be traversed to reach each location, as a function of a crew experience level, as a function of a crew size, as a function of the crew equipment, as a function of current weather conditions, as a function of current road conditions, etc. Of course, v may be defined as a constant value or using a probability function as discussed with reference to $T_R$.

In an operation 408, route assignments are determined. In an illustrative embodiment, the service route assigned to each crew of the plurality of crews includes a start location as a first location and as a last location of the crew such that the crews are deployed from and return to the same location. Of course, in alternative embodiments, the last location of the crew may be a different location than the start location. The start/end location may be the same or different for each crew. For example, the start/end location may be defined for each crew in the crew data or a single start/end location may be defined and entered as an input by the user using a user interface window and stored in database 326. Of course, a first group of crews may be assigned a first start/end location, a second group of crews may be assigned a second start/end location, etc. The service route for each crew of the plurality of crews identified in the crew data also includes at least one location of the plurality of locations defined in the outage data.

Figure 5:
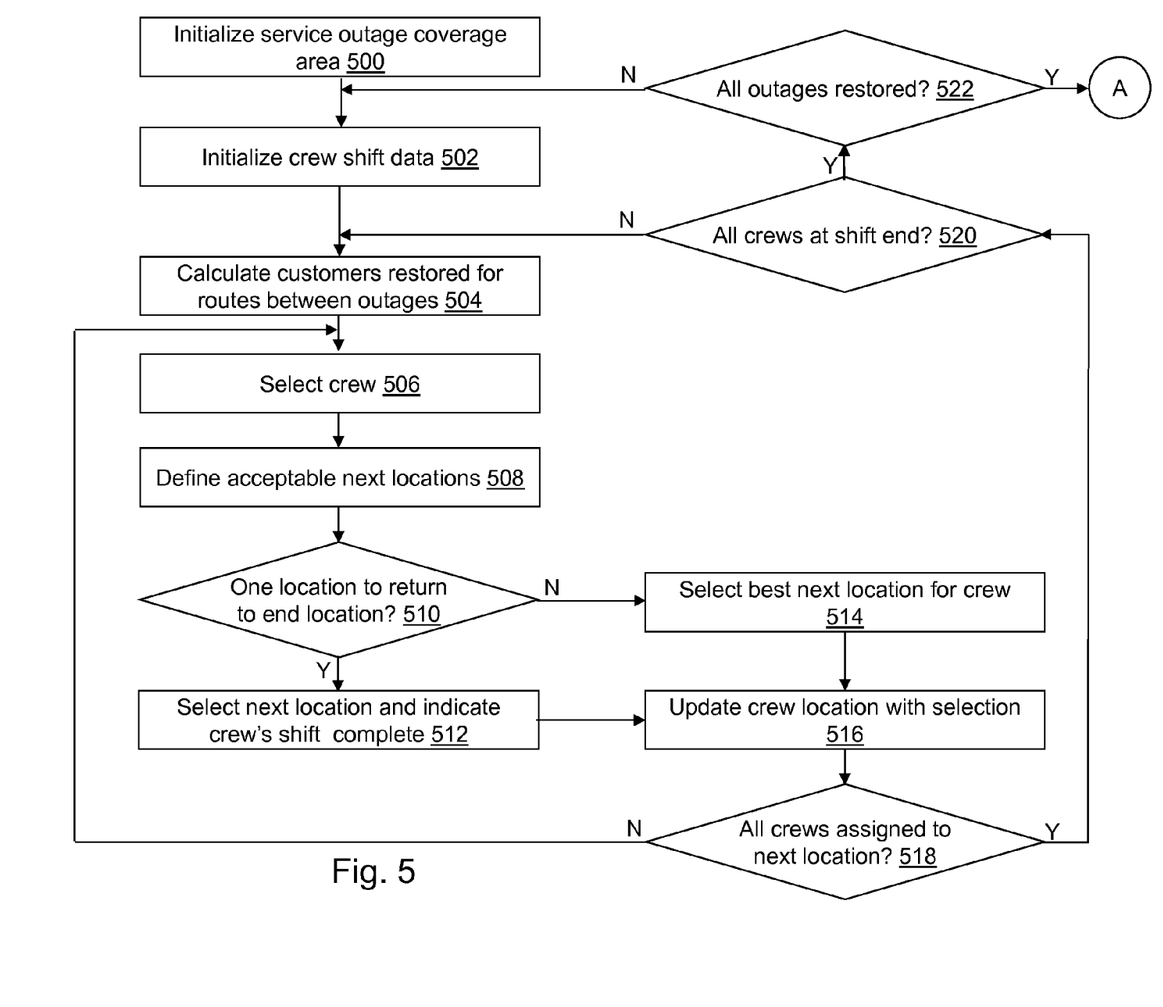
FIG. 5 depicts a second flow diagram illustrating examples of operations performed by the routing assignment system of FIG. 3 in accordance with an illustrative embodiment.

For example, route assignments may be determined as described with reference to FIG. 5. FIG. 5 provides additional example operations associated with route assignment application 324. Additional, fewer, and/or different operations may be performed depending on the embodiment. The order of presentation of the operations of FIG. 5 is not intended to be limiting. Although some of the operational flows are presented in sequence, the various operations may be performed in various repetitions, concurrently (in parallel), and/or in other orders than those that are illustrated.

In an operation 500, variables are created and initialized for route assignment application 324. A service outage coverage area for which the crew is assigned, the starting time for the outage metric, and the initial outage information. For example, a coverage area may include a town, a city, a region, etc. Outage plans are developed regionally by utility operation centers serving towns, cities, or geographically bounded zones, which may be segmented by feeder or substation boundaries.

In an operation 502, crew shift data is initialized. For example, a large number of crews may be assigned to work in the service outage coverage area though different groups of the crews may be organized into different shifts. Utilities use internal and external crews to restore power to customers after outages. Information from each of the crews is collected in terms of the numbers of hours available to work with consideration for union and non-union work requirements. Additionally, the skill-set and types of crews, such as a 2-person crew, a 3-person crew, etc. is collected for outage planning and optimization. A crew shift model may be initialized to identify the plurality of crews assigned to each shift. The time is updated for start of shift, and the crews are given a starting location. The skills of the crews may be assigned.

In an operation 504, a number of customers restored per a predefined time period for pairs of locations of the plurality of locations is calculated based on the number of customers restored by the repair, the estimated travel time, and the estimated repair time. For example, the pairs of locations may be selected based on current locations of the plurality of crews. If all of the crews are initially located at the same start location, the pairs of locations include each route from the start location to each other location of the plurality of locations. The predefined time period may be a minute, five minutes, ten minutes, twenty minutes, thirty minutes, forty minutes, fifty minutes, an hour, etc. The predefined time period may be entered and/or selected by the user using, for example, a user interface window, may be stored in database 326, etc. The predefined time period does not change the results. Its selection is similar to selecting units of measure.

In an operation 506, a crew is selected from the plurality of crews currently being assigned routes. If a crew shift is indicated as complete, a next crew may be selected from the plurality of crews currently being assigned routes.

In an operation 508, acceptable next locations are defined for the selected crew from the pairs of locations identified in operation 504. As locations are assigned to each crew, the current crew location is updated. The pairs of locations that do not include the current crew location may be removed from the acceptable next locations for the selected crew. Each pair of the pairs of locations that includes an endpoint location at which the crew skill indicator for the selected crew does not satisfy the type of repair to perform at the endpoint location may be removed from the acceptable next locations for the selected crew. Additionally, each pair of the pairs of locations that includes an endpoint location for which a crew has already been assigned or for which the service has been restored may be removed from the acceptable next locations for the selected crew.

Additionally, each pair of the pairs of locations that includes an endpoint location for which a maximum work time for the selected crew is exceeded may be removed from the acceptable next locations. For example, the estimated travel time to the endpoint location is added to the estimated repair time associated with the endpoint location. This additional value is added to the current estimated work time for the selected crew. If this value exceeds the maximum work time defined for the selected crew, the endpoint location may be eliminated as an acceptable next location for the crew. The remaining endpoint locations define acceptable next locations for the selected crew based on the current location of the selected crew.

In an operation 510, a determination is made concerning whether or not only one next location of the acceptable next locations is the end location defined for the crew. If only one next location of the acceptable next locations is the end location defined for the crew, processing continues in an operation 512. If more than one next location of the acceptable next locations is the last location defined for the crew, processing continues in an operation 514.

In operation 512, a next location selected for the selected crew is the end location, and a crew shift is indicated as complete, for example, by setting a flag value to one or "true".

In operation 514, a next location for the selected crew is selected from the acceptable next locations based on the calculated number of customers restored per the predefined time period. For example, the acceptable next locations may be evaluated to determine which next location maximizes the number of customers restored per the predefined time period. To determine the next outage location for a given crew, constraints are considered as well as the potential number of customers restored while satisfying the crew's availability to complete restoration and return to the ending location such as the operations center within the allotted time the crews are allowed to work. Skill set differentials may also be considered as to the applicability of the crew to be able to repair the task at that outage location. In an illustrative embodiment, the allowable route with the highest number of customers restored per the predefined time period is selected. In another illustrative embodiment, the proximity of the destination to outages requiring a crew skill may be considered. For example, an optimization may be executed that maximizes the customers restored per the predefined time period and minimizes the travel time of skilled crews to outages requiring skilled crews to essentially look ahead to the next outage for skilled crews.

In operation 516, a location of the selected crew is updated as the selected next location. The location represents the current crew location. Additionally, a shift work time may be updated based on the estimated repair time for the selected next location and based on the estimated travel time to the selected next location. The current estimated work time for the selected crew may be updated to include these values.

In an operation 518, a determination is made concerning whether or not each crew of the plurality of crews for which the crew shift is indicated as incomplete and for which routes are being determined has been assigned a next location. If each crew has been assigned a next location, processing continues in an operation 520. If each crew has not been assigned a next location, processing continues in operation 506 to select the next crew from the plurality of crews.

In operation 520, a determination is made concerning whether or not the crew shift is indicated as complete for each crew of the plurality of crews for which routes are being determined. If the crew shift is indicated as complete for each crew, processing continues in an operation 522. If the crew shift is not indicated as complete for each crew, processing continues in operation 504 to re-calculate the number of customers restored per the predefined time period for pairs of locations of the plurality of locations. For example, the pairs of locations may be selected based on current locations of the plurality of crews for which the shift is incomplete. The pairs of locations may include each route from the current locations of the plurality of crews to each other location of the plurality of locations. Locations assigned to a crew in operation 516 may not be included in the pairs of locations.

In operation 522, a determination is made concerning whether or not all of the service outages have been restored. If all of the service outages have been restored, processing continues in an operation 410 or in an operation 422. If all of the service outages have not been restored, processing continues in operation 502 to re-initialize the crew shift data, for example, with a differently plurality of crews and/or a different shift start time.

Figure 6:
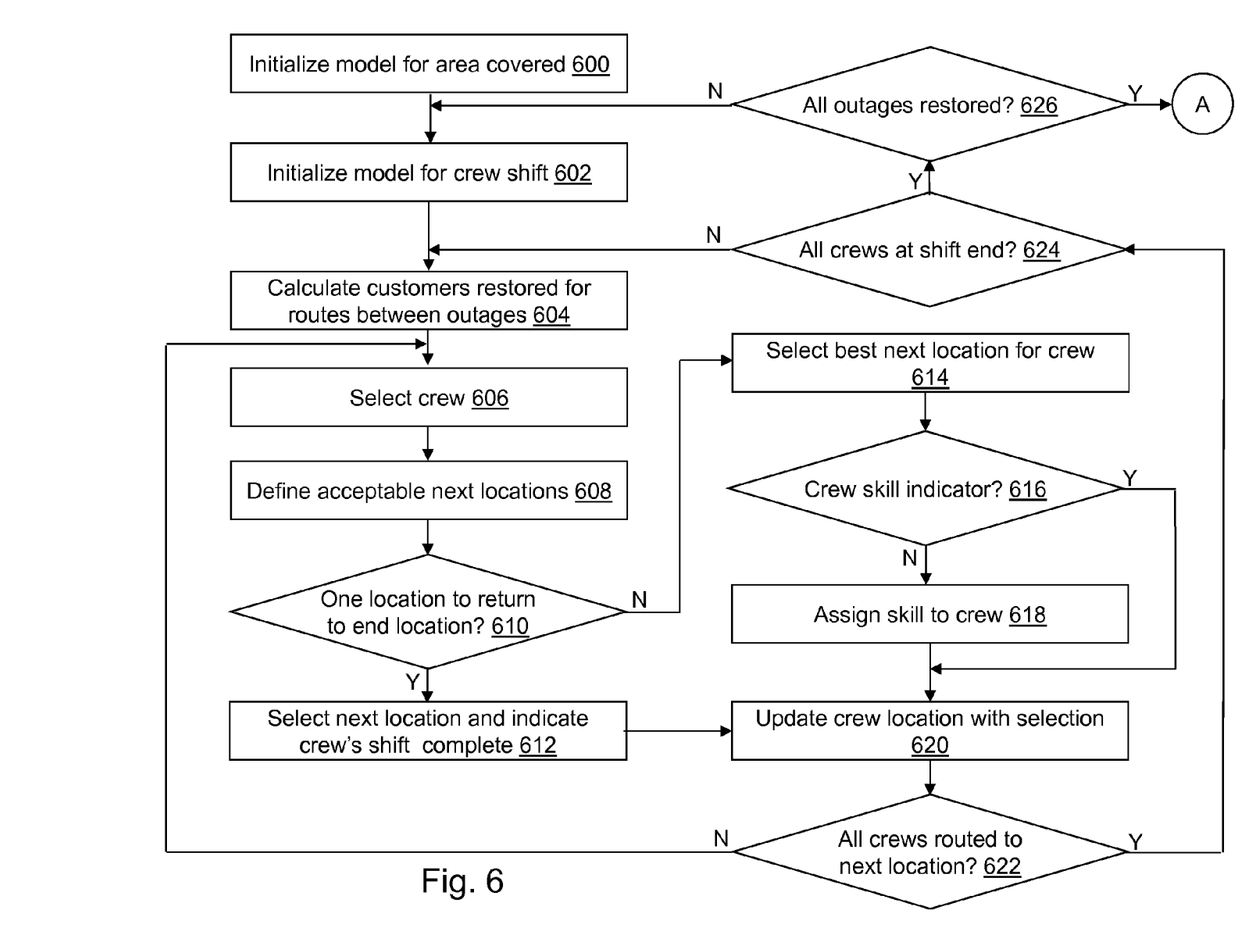
FIG. 6 depicts a third flow diagram illustrating examples of operations performed by the routing assignment system of FIG. 3 in accordance with an illustrative embodiment.

As another example, route assignments may be determined as described with reference to FIG. 6. FIG. 6 provides additional example operations associated with route assignment application 324. Additional, fewer, and/or different operations may be performed depending on the embodiment. The order of presentation of the operations of FIG. 6 is not intended to be limiting. Although some of the operational flows are presented in sequence, the various operations may be performed in various repetitions, concurrently (in parallel), and/or in other orders than those that are illustrated.

Similar to operation 500, in an operation 600, the service outage coverage area is initialized. Similar to operation 502, in an operation 602, crew shift data is initialized. In the illustrative embodiment of FIG. 6, the crew shift data may not be defined with a crew skill indicator for one or more of the plurality of crews.

Similar to operation 504, in an operation 604, the number of customers restored per the predefined time period for pairs of locations of the plurality of locations is calculated based on the estimated travel time and the estimated repair time. Similar to operation 506, in an operation 606, a crew is selected from the plurality of crews currently being assigned routes.

Similar to operation 508, in an operation 608, acceptable next locations are defined for the selected crew from the pairs of locations identified in operation 604. The selected crew may not have a defined crew skill indicator. If the crew skill indicator is not defined for the selected crew, endpoint locations may not be removed based on the comparison between the type of repair to perform at the endpoint location and the crew skill indicator.

Similar to operation 510, in an operation 610, a determination is made concerning whether or not only one next location of the acceptable next locations is the end location defined for the crew. If only one next location of the acceptable next locations is the end location defined for the crew, processing continues in an operation 612. If more than one next location of the acceptable next locations is the last location defined for the crew, processing continues in an operation 614.

Similar to operation 512, in operation 612, the next location selected for the selected crew is the end location, and the crew shift is indicated as complete. Similar to operation 514, in operation 614, a next location for the selected crew is selected from the acceptable next locations based on the calculated number of customers restored per the predefined time period.

In an operation 616, a determination is made concerning whether or not the crew skill indicator is defined for the selected crew. If the crew skill indicator is not defined, processing continues in an operation 618. If the crew skill indicator is defined, processing continues in an operation 620. In operation 618, the crew skill indicator is defined for the selected crew based on the type of repair to perform at the endpoint location.

Similar to operation 516, in operation 620, a determination is made concerning whether or not each crew of the plurality of crews for which the crew shift is indicated as incomplete and for which routes are being determined has been assigned a next location. If each crew has been assigned a next location, processing continues in an operation 624. If each crew has not been assigned a next location, processing continues in operation 606 to select the next crew from the plurality of crews.

Similar to operation 520, in operation 624, a determination is made concerning whether or not the crew shift is indicated as complete for each crew of the plurality of crews for which routes are being determined. If the crew shift is indicated as complete for each crew, processing continues in an operation 626. If the crew shift is not indicated as complete for each crew, processing continues in operation 604 to re-calculate the number of customers restored per the predefined time period for pairs of locations of the plurality of locations.

Similar to operation 522, in operation 626, a determination is made concerning whether or not all of the service outages have been restored. If all of the service outages have been restored, processing continues in operation 410 or in operation 422. If all of the service outages have not been restored, processing continues in operation 602 to re-initialize the crew shift data, for example, with a differently plurality of crews and/or a different shift start time.

With continuing reference to FIG. 4, in operation 410, the determined route assignments are evaluated and route assignments selected. For example, the route assignments determined using the operations described with reference to FIG. 5 or FIG. 6 may be selected as the route assignments. As another example, the route assignments determined using the operations described with reference to FIG. 5 or FIG. 6 may be used as a pre-solution input to an optimization algorithm to improve an upper bound for a minimization problem. The solution from the optimization algorithm may be selected as the route assignments.

As yet another example, the route assignments determined after satisfaction of operation 520 of FIG. 5 or after satisfaction of operation 624 of FIG. 6 may be used as a pre-solution input to an optimization algorithm to improve an upper bound for a minimization problem. The solution from the optimization algorithm may be selected as the route assignments and remaining outages assigned in an additional execution of the operations of FIG. 5 or FIG. 6 for a next crew shift. For example, routes may be defined for the same plurality of crews for a second day or after a minimum rest for the plurality of crews has passed.

As another example, routes may be defined for a second plurality of crews that is working a next shift. The second plurality of crews may differ from the initial plurality of crews by one or more crews.

As still another example, the route assignments determined after satisfaction of operation 522 of FIG. 5 or after satisfaction of operation 626 of FIG. 6 may be used as a pre-solution input to an optimization algorithm to improve an upper bound for a minimization problem. This ensures the heuristic solution as an upper bound to customer outage time meaning the optimization can only improve the results. Optimization time is reduced by providing a pre-solution.

As an example optimization algorithm, a mixed integer linear program (MILP) may be used to minimize a total customer time without the service. As an example, SAS®OR includes an OPTMODEL procedure that provides a framework for specifying and solving a MILP. The MILP solver, available in the OPTMODEL procedure, implements a linear program-based branch-and-bound algorithm that solves the original problem by solving linear programming relaxations of a sequence of smaller subproblems.

For illustration, route assignments may be determined by minimizing $$\sum_{j \in N} t_j C_j \text{ subject to} \quad (1)$$

$$\sum_{v \in V} \sum_{j \in N} x_{ijv} \leq 1, \forall i \in N, i \neq n_0 \quad$$

$$\sum_{j \in N} x_{n_0 jv} \leq 1, \forall v \in V, j \neq n_0 \quad (2)$$

$$\sum_{i \in N} x_{ijv} - \sum_{i \in N} x_{jiv} = 0, \forall j \in N, \forall v \in V \quad (3)$$

$$x_{iiv} = 0, \forall i \in N, \forall v \in V \quad (4)$$

$$rS_{js} x_{ijv} \leq vS_{vs}, \forall i \in N, \forall j \in N, \forall v \in V, \forall S \in S, j \neq n_0 \quad (5)$$

$$t_{n_0} = 0 \quad (6)$$

$$t_i \geq 0, \forall i \in N \quad (7)$$

$$Sh_{n_0 v} \leq \text{MaxSh}_v, \forall v \in V \quad (8)$$

$$t_i + T_{T_{ij}} + T_{R_j} - t_j \leq P(1 - x_{ijv}), \forall i \in N, \forall j \in N, \forall v \in V, j \neq n_0 \quad (9)$$

$$t_i + T_{T_{in_0}} - Sh_{n_0 v} \leq P(1 - x_{in_0 v}), \forall i \in N, \forall v \in V \quad (10)$$

$$\sum_{v \in V} \sum_{i \in N} x_{ijv} \geq 1 - \frac{t_j}{P}, \forall j \in N, j \neq n_0 \quad (11)$$

where $t_{n_0}$ is a start time; N is a number of the service outage source locations; V is the number of crews; $j=n_0$ is the start/end location; $t_i$ is a time elapsed until service outage source location j is restored; $C_j$ is the number of affected customers associated with service outage source location j; $x_{ijv}=1$ if the equipment of crew v travels from service outage source location i to service outage source location j, otherwise $x_{ijv}=0$; $rS_{js}=1$ if skill S is needed to repair service outage source location j otherwise $rS_{js}=0$; $vS_{vs}=1$ if the equipment/crew of crew v has skill s, otherwise $vS_{vs}=0$; $Sh_{n_0 v}$ is a total time for the shift of crew v, $T_{T_{ij}}$ is the travel time between service outage source location i and service outage source location j, $T_{R_j}$ is the repair time for service outage source location j, MaxSh$_v$ is a maximum shift time for crew v, and P is a time penalty for service outage source locations that are not serviced.

If a customer is not served in the expected location, the cumulative outage time continues until that customer is restored. As a result, P may be zero for those customers since the cumulative outage time acts effectively as a penalty in the optimization. Conversely, a utility can assess a penalty for not restoring power to specific types of customers or even specific customers. For example, restoration of the service may be more critical for some customers than others. As examples, P may be greater than zero for customers like banks, prisons, hospitals, etc. for which restoration should be performed as a higher priority. The value of P may increase as the priority for restoration of the customer increases relative to other customers. P may be defined for each service outage source location.

Constraint (1) ensures that each service outage source location is visited at most one time. Constraint (2) ensures the crew equipment, such as the vehicle, travels at most one route. Constraint (3) ensures the start/end location for each crew is the same. Constraint (4) ensures the crew equipment, such as the vehicle, does not travel to itself. Constraint (5) ensures the crew equipment type indicator and/or crew skill indicator satisfies the type of service to perform at each location. If crew v travels to service outage source location j, crew v has the needed skills to perform the service needed at service outage source location j. Constraint (6) sets the start time at zero. Constraint (7) ensures the elapsed time is positive. Constraint (8) ensures the crews work within their shift time constraints. For example, constraint (8) ensures that crews do not work "overtime". Constraints (9) and (10) ensure $t_i$ is the elapsed time. Constraint (11) imposes a time penalty for service outage source locations that are not serviced. A greater or a fewer number of constraints may be applied in the minimization.

A genetic algorithm optimization or other stochastic or evolutionary optimization methods could be used. Additional algorithms may also be used including: adding tree crews for outage pre-work optimization to expedite power restoration and incorporating transformer delivery and drop-off and total daily outage restoration for safety tag-out procedures.

In an operation 412, the determined route assignments are output. For example, the determined route assignments are stored to second computer-readable medium 310/database 326. In addition or in the alternative, the determined route assignments are presented in second display 318, for example, using SAS®VA. In addition or in the alternative, the determined route assignment for each crew is sent to the associated crew communication device 200 using second communication interface 308 and communication interface 208. In addition or in the alternative, the determined route assignments are printed using in second printer 322 and delivered to each crew.

In an operation 414, a determination is made concerning whether or not updated crew data, updated outage data, updated repair time data, and/or updated travel time data is received or identified. For example, additional service outage source locations may be reported, service outage source locations may be identified as completed with a shorter or a longer repair time than estimated, roads may be reopened, etc.

Updated crew data may be received from crew communication device 200 using communication interface 208 and second communication interface 308. If updated data is received, processing continues in an operation 416. If updated data is not received, processing continues in operation 414 to await receipt of updated data.

In operation 416, the appropriate data is updated. For example, actual repair times are defined for service outage source locations when the repair is completed. A remaining plurality of service outage source locations may be determined based on the updated data. A current crew location for each crew of the plurality of crews may be determined from the updated data.

In an operation 418, the estimated travel time, $T_T$, identified in operation 406 may be updated.

Similar to operation 408, in an operation 420, updated route assignments are determined. For example, a revised route for each crew is determined using the updated data and the operations of FIG. 5 or FIG. 6. The revised service route may be defined from the current crew location for each crew of the plurality of crews. The plurality of crews available to reroute may change based on additional crews becoming available to work.

Similar to operation 410, in operation 422, the updated route assignments are selected from the determined updated route assignments. Similar to operation 408, in an operation 424, the updated route assignments are output. In an operation 426, the updated route assignments are sent to each crew. For example, the revised route may be sent to a deployed crew using second communication interface 308 and communication interface 208 if the revised route assignment is different than the currently assigned route. Processing continues in operation 414 to await receipt of updated data.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A non-transitory computer-readable medium having stored thereon computer-readable instructions that when executed by a computing device cause the computing device to:

receive outage data identifying a plurality of service outage source locations, a number of affected customers associated with each location of the plurality of locations, and a type of repair to perform at each location of the plurality of locations;

receive crew data identifying a plurality of crews;

estimate a repair time for each location of the plurality of locations;

estimate a travel time between pairs of locations of the plurality of locations;

calculate a number of customers restored per a predefined time period for the pairs of locations of the plurality of locations based on the estimated travel time and the estimated repair time;

determine a service route for each crew of the plurality of crews based on a crew skill indicator associated with each crew satisfying the type of repair to perform at each location of the plurality of locations and based on the calculated number of customers restored, wherein the service route for each crew of the plurality of crews includes a plurality of repair locations of the plurality of locations;

store at least a first repair location of the determined service route for sending electronically to a respective crew of the plurality of crews; and electronically send at least the first repair location of the determined service route to a second computing device different from the computing device, wherein at least the first repair location is presented on a display communicably connected to the second computing device to notify the respective crew of their first repair location.

2. The computer-readable medium of claim 1, wherein the estimated repair time for each location of the plurality of locations is determined based on a probability function.

3. The computer-readable medium of claim 2, wherein the probability function is defined based on the type of repair to perform at each location of the plurality of locations.

4. The computer-readable medium of claim 3, wherein the probability function is further defined based on analysis of a dataset of actual repair times based on the type of repair.

5. The computer-readable medium of claim 1, wherein the estimated repair time for each location of the plurality of locations is a constant value defined as a function of the type of repair to perform at each location of the plurality of locations.

6. The computer-readable medium of claim 1, wherein the computer-readable instructions further cause the computing device to estimate a travel time between each location of the plurality of locations, wherein the service route determined for each crew of the plurality of crews is further based on the estimated travel time between each location of the plurality of locations.

7. The computer-readable medium of claim 6, wherein the estimated travel time for each location of the plurality of locations is based on a distance between a pair of locations of the plurality of locations and a speed.

8. The computer-readable medium of claim 7, wherein the distance is determined based on existence of a road between the pair of locations.

9. The computer-readable medium of claim 8, wherein the speed is determined based on a condition of the road between the pair of locations.

10. The computer-readable medium of claim 6, wherein the estimated travel time between the pair of locations of the plurality of locations is determined based on a probability function.

11. The computer-readable medium of claim 1, wherein a start location is the same for each crew of the plurality of crews and the start location is a starting point for the determined service route.

12. The computer-readable medium of claim 1, wherein the crew data further identifies a maximum work time for each crew of the plurality of crews, wherein the service route determined for each crew of the plurality of crews is further based on a work time for each crew being less than or equal to the maximum work time for the respective crew.

13. The computer-readable medium of claim 1, wherein the computer-readable instructions further cause the computing device to:
- receive updated outage data identifying a remaining plurality of service outage source locations and a number of affected customers associated with each location of the remaining plurality of locations;
- receive updated crew data identifying a current crew location for the plurality of crews;
- estimate an updated travel time between pairs of locations of the remaining plurality of locations;
- calculate an updated number of customers restored per an updated predefined time period for the pairs of locations of the remaining plurality of locations based on the estimated updated travel time and the estimated repair time; and
- determine an updated service route from the current crew location for each crew of the plurality of crews based on the calculated updated number of customers restored for each remaining location of the remaining plurality of locations.

14. The computer-readable medium of claim 13, wherein the computer-readable instructions further cause the computing device to store at least a next repair location of the determined updated service route for sending to the respective crew of the plurality of crews.

15. The computer-readable medium of claim 1, wherein a service outage at the plurality of service outage source locations is a power outage and the type of repair is selected from the group consisting of tree cutting, overhead line repair, underground line repair, overhead transformer repair, underground transformer repair, overhead transformer replacement, and underground transformer replacement.

16. The computer-readable medium of claim 1, wherein the service route for the crew of the plurality of crews includes a start location as a last location of the crew.

17. The computer-readable medium of claim 1, wherein the computer-readable instructions further cause the computing device to minimize a total customer time without a service subject to the crew skill indicator satisfying the type of repair to perform at each location of the plurality of locations using a mixed integer linear program with the determined service route for each crew of the plurality of crews as an initial condition.

18. The computer-readable medium of claim 1, wherein determining the service route for each crew of the plurality of crews comprises:
(a) selecting a crew of the plurality of crews;
(b) removing each pair of locations of the pairs of locations that include an endpoint location at which the crew skill indicator for the selected crew does not satisfy the type of repair to perform at the endpoint location or that is already assigned to a crew, thereby defining acceptable next locations for the selected crew;
(c) selecting a next location from the acceptable next locations based on the calculated number of customers restored per the predefined time period;
(d) updating a location of the selected crew as the selected next location; and
(e) repeating (b)-(d) with a next crew as the selected crew until the updated location is selected for each crew of the plurality of crews.

19. The computer-readable medium of claim 18, wherein selecting the next location from the acceptable next locations is based on maximizing the number of customers restored.

20. The computer-readable medium of claim 1, wherein the predefined time period is selected from the group consisting of a minute, five minutes, ten minutes, twenty minutes, thirty minutes, forty minutes, fifty minutes, and an hour.

21. The computer-readable medium of claim 1, wherein the pairs of locations are selected based on current locations of the plurality of crews.

22. The computer-readable medium of claim 1, wherein determining the service route for each crew of the plurality of crews comprises:
(a) initializing a shift work time as a shift start time for the plurality of crews;
(b) selecting a crew of the plurality of crews;
(c) removing each pair of locations of the pairs of locations that include an endpoint location at which the crew skill indicator for the selected crew does not satisfy the type of repair to perform at the endpoint location or for which a crew has been assigned or for which a maximum work time for the crew is exceeded, thereby defining acceptable next locations for the selected crew;
(d) based on only one next location of the acceptable next locations being a last location defined for the crew, selecting a next location as the last location and indicate a crew shift as complete;
(e) based on more than one next location of the acceptable next locations being the last location defined for the crew, selecting a next location from the acceptable next locations based on the calculated number of customers restored per the predefined time period;
(f) updating a location of the selected crew as the selected next location;
(g) updating a shift work time based on the estimated repair time for the selected next location and based on the estimated travel time to the selected next location;
(h) repeating (c)-(g) with a next crew as the selected crew until the updated location is selected for each crew of the plurality of crews for which the crew shift is incomplete; and
(i) repeating calculation of the number of customers restored and (b)-(h) until the crew shift of each crew of the plurality of crews is complete.

23. The computer-readable medium of claim 1, wherein determining the service route for each crew of the plurality of crews comprises:
(a) initializing a shift work time as a shift start time for the plurality of crews;
(b) selecting a crew of the plurality of crews;
(c) removing each pair of locations of the pairs of locations that include an endpoint location at which the crew skill indicator for the selected crew does not satisfy the type of repair to perform at the endpoint location or for which a crew has been assigned or for which a maximum work time for the crew is exceeded, thereby defining acceptable next locations for the selected crew;
(d) based on only one next location of the acceptable next locations being a last location defined for the crew, selecting a next location as the last location and indicate a crew shift as complete;

(e) based on more than one next location of the acceptable next locations being the last location defined for the crew, selecting a next location from the acceptable next locations based on the calculated number of customers restored per the predefined time period;
(f) updating a location of the selected crew as the selected next location;
(g) updating a shift work time based on the estimated repair time for the selected next location and based on the estimated travel time to the selected next location;
(h) repeating (c)-(g) with a next crew as the selected crew until the updated location is selected for each crew of the plurality of crews for which the crew shift is incomplete;
(i) repeating calculation of the number of customers restored and (b)-(h) until the crew shift of each crew of the plurality of crews is complete; and
(j) repeating (a)-(i) with the shift start time defined as a next shift start time.

24. The computer-readable medium of claim 23, wherein (j) is repeated for a second plurality of crews different from the plurality of crews.

25. The computer-readable medium of claim 1, wherein determining the service route for each crew of the plurality of crews comprises:
    (a) selecting a crew of the plurality of crews;
    (b) based on the crew skill indicator being assigned to the selected crew, removing each pair of locations of the pairs of locations that include an endpoint location at which the crew skill indicator for the selected crew does not satisfy the type of repair to perform at the endpoint location or that is already assigned to a crew, thereby defining acceptable next locations for the selected crew;
    (c) based on no crew skill indicator being assigned to the selected crew, removing each pair of locations of the pairs of locations that is already assigned to a crew, thereby defining acceptable next locations for the selected crew;
    (d) selecting a next location from the acceptable next locations based on the calculated number of customers restored per the predefined time period;
    (e) based on no crew skill indicator being assigned to the selected crew, assigning a crew skill indicator to the selected crew based on the type of repair to perform at the selected next location;
    (f) updating a location of the selected crew as the selected next location; and
    (g) repeating (b)-(f) with a next crew as the selected crew until the updated location is selected for each crew of the plurality of crews.

26. A system comprising:
a processor; and
a non-transitory computer-readable medium operably coupled to the processor, the computer-readable medium having computer-readable instructions stored thereon that, when executed by the processor, cause the system to
    receive outage data identifying a plurality of service outage source locations, a number of affected customers associated with each location of the plurality of locations, and a type of repair to perform at each location of the plurality of locations;
    receive crew data identifying a plurality of crews;
    estimate a repair time for each location of the plurality of locations;
    estimate a travel time between pairs of locations of the plurality of locations;
    calculate a number of customers restored per a predefined time period for the pairs of locations of the plurality of locations based on the estimated travel time and the estimated repair time;
    determine a service route for each crew of the plurality of crews based on the crew skill indicator satisfying the type of repair to perform at each location of the plurality of locations and based on the calculated number of customers restored, wherein the service route for each crew of the plurality of crews includes a plurality of repair locations of the plurality of locations;
    store at least a first repair location of the determined service route for sending electronically to a respective crew of the plurality of crews; and
    electronically send at least the first repair location of the determined service route to a second computing device, wherein at least the first repair location is presented on a display communicably connected to the second computing device to notify the respective crew of their first repair location.

27. A method of determining service routes for a plurality of crews, the method comprising:
    receiving, at a first device, outage data identifying a plurality of service outage source locations, a number of affected customers associated with each location of the plurality of locations, and a type of repair to perform at each location of the plurality of locations;
    receiving, at the first device, crew data identifying a plurality of crews;
    estimating, by the first device, a repair time for each location of the plurality of locations;
    estimating, by the first device, a travel time between pairs of locations of the plurality of locations;
    calculating, by the first device, a number of customers restored per a predefined time period for the pairs of locations of the plurality of locations based on the estimated travel time and the estimated repair time;
    determining, by the first device, a service route for each crew of the plurality of crews based on the crew skill indicator satisfying the type of repair to perform at each location of the plurality of locations and based on the calculated number of customers restored, wherein the service route for each crew of the plurality of crews includes a plurality of repair locations of the plurality of locations;
    storing at least a first repair location of the determined service route for sending electronically to a respective crew of the plurality of crews; and
    electronically sending at least the first repair location of the determined service route from the first device to a second device, wherein at least the first repair location is presented on a display communicably connected to the second device to notify the respective crew of their first repair location.

* * * * *